(12) United States Patent
Chen

(10) Patent No.: US 9,375,733 B2
(45) Date of Patent: Jun. 28, 2016

(54) METHOD AND DEVICE FOR COATING ALIGNMENT FILM

(71) Applicant: Shenzhen China Star Optoelectronics Technology Co., Ltd., Shenzhen, Guangdong (CN)

(72) Inventor: Jie Chen, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 228 days.

(21) Appl. No.: 14/348,853

(22) PCT Filed: Jan. 23, 2014

(86) PCT No.: PCT/CN2014/071165
§ 371 (c)(1),
(2) Date: Mar. 31, 2014

(87) PCT Pub. No.: WO2015/100823
PCT Pub. Date: Jul. 9, 2015

(65) Prior Publication Data
US 2015/0336113 A1    Nov. 26, 2015

(30) Foreign Application Priority Data

Dec. 30, 2013 (CN) .......................... 2013 1 0746870

(51) Int. Cl.
| | | |
|---|---|---|
| *B05B 1/02* | (2006.01) | |
| *B05D 1/02* | (2006.01) | |
| *B05B 9/04* | (2006.01) | |
| *G02F 1/1337* | (2006.01) | |
| *B05B 9/00* | (2006.01) | |
| *B05B 13/02* | (2006.01) | |

(52) U.S. Cl.
CPC . *B05B 1/02* (2013.01); *B05B 9/002* (2013.01); *B05B 9/04* (2013.01); *B05B 9/0403* (2013.01); *B05B 13/0221* (2013.01); *B05D 1/02* (2013.01); *G02F 1/133723* (2013.01)

(58) Field of Classification Search
None
See application file for complete search history.

(56) References Cited

U.S. PATENT DOCUMENTS

| | | | | |
|---|---|---|---|---|
| 6,102,507 | A * | 8/2000 | Yoshida | B41J 2/195 347/6 |
| 2005/0219282 | A1* | 10/2005 | Kachi | B41J 2/175 347/6 |
| 2006/0103687 | A1* | 5/2006 | Chung | B41J 2/17513 347/6 |
| 2009/0091677 | A1* | 4/2009 | Cho | G02F 1/13392 349/46 |

FOREIGN PATENT DOCUMENTS

CN           1576960 A      2/2005

\* cited by examiner

*Primary Examiner* — Nathan T Leong
(74) *Attorney, Agent, or Firm* — Andrew C. Cheng

(57) ABSTRACT

The present invention relates to a method and a device for coating an alignment film. The method includes: (1) providing a substrate to which an alignment film is to be coated and placing the substrate to which an alignment film is to be coated on a working table that is reciprocally movable frontward and rearward and leftward and rightward; (2) providing a pressurization tank and depositing a predetermined amount of an alignment liquid in the pressurization tank; (3) providing a supply tank and using a liquid pump to convey the alignment liquid contained in the pressurization tank to the supply tank; (4) using a supply conduit to connect the supply tank to an alignment liquid jet nozzle and subjecting the supply conduit heating to reduce viscosity of the alignment liquid so as to allow the alignment liquid to smoothly move into the alignment liquid jet nozzle; and (5) operating the alignment liquid jet nozzle to apply the viscosity reduced alignment liquid to the substrate to which an alignment film is to be coated and, when necessary, reciprocally moving the working table during the process of application so as to have the alignment liquid uniformly coated on the substrate and complete the coating of the alignment film. The present invention improves surface uniformity of an alignment film so as to ensure product quality and enhance product yield rate.

4 Claims, 3 Drawing Sheets

000000# METHOD AND DEVICE FOR COATING ALIGNMENT FILM

BACKGROUND OF THE INVENTION

1. Field of the Invention

The present invention relates to the field of manufacture of liquid crystal displays, and in particular to a method and a device for coating an alignment film.

2. The Related Arts

Liquid crystal displays (LCDs) have a variety of advantages, such as thin device body, low power consumption, and being free of radiation, and are thus widely used. However, it is well known that the liquid crystal displays are passive light emission devices and the liquid crystal material does not give off light by itself. Thus, most of the liquid crystal displays that are currently available in the market are backlighting liquid crystal displays, which comprise a liquid crystal display panel and a backlight module.

The operation principle of the liquid crystal display panel is that, with liquid crystal molecules interposed between two parallel glass substrates, a driving voltage is applied to the two glass substrates to control the liquid crystal molecules to change direction in order to refract out light emitting from the backlight module to generate an image. The liquid crystal display panel is generally made up of a color filter (CF) substrate, a thin-film transistor (TFT) array substrate, liquid crystal (LC) interposed between the CF substrate and the TFT array substrate, and a sealant and the manufacturing process generally comprises: a front stage of array process (including thin film, yellow light, etching, and film stripping), an intermediate stage of cell process (including laminating the TFT substrate and the CF substrate), and a rear stage of assembling process (including mounting of drive ICs and printed circuit board), in which the front stage of array process is generally to form the TFT substrate in order to control the movement of the liquid crystal molecules; the intermediate stage of cell process is generally to fill the liquid crystal between the TFT array substrate and the CF substrate and to seal the liquid crystal between the TFT array substrate and the CF substrate; and the rear stage of assembling process is generally to mount the drive ICs and to integrate the printed circuit board in order to achieve driving of the liquid crystal molecules to rotate for displaying images.

Heretofore, in the intermediate stage of cell process, an alignment film (polyimide, PI) is first formed on the TFT array substrate and the CF substrate. Then, a sealant for an enclosing frame is coated on the TFT array substrate and, thereafter, liquid crystal is dropped therein. Afterward, the TFT array substrate and the CF substrate are laminated in a vacuum condition. Finally, ultraviolet light is applied to irradiate and cure the enclosing frame sealant so as to complete the packaging of the TFT array substrate and the CF substrate.

As shown in FIG. 1, techniques that are conventionally used to coat an alignment film often adopt inkjet techniques, of which a practical operation process is as follows: Alignment liquid is first deposited in a pressurization tank 100 and then, the alignment liquid is fed to a supply tank 200 by a liquid pump 300 connected between the pressurization tank 100 and the supply tank 200 to have the alignment liquid contained in the supply tank 200 subsequently conveyed through a supply conduit 400 to an alignment liquid jet nozzle 500. Finally, the alignment liquid jet nozzle 500 applies the alignment liquid to a substrate 700 that is placed on a work tale 600 that is reciprocally movable frontward and rearward, and leftward and rightward, so as to achieve coating of an alignment film.

However, the primary ingredients of the alignment liquid include polyimide, N-methylpyrrolidone (NMP), and ethylene glycol monobutyl ether (BC), having a relatively high viscosity. For such an alignment liquid having a high viscosity, the known inkjet techniques cannot effectively jet it so that it is not possible to ensure surface uniformity of an alignment film.

SUMMARY OF THE INVENTION

Thus, an object of the present invention is to provide a method for coating an alignment film, which allows a high viscosity alignment liquid to be smoothly jetted out from a supply conduit by subjecting the supply conduit.

Another object of the present invention is to provide a device for coating an alignment film, which has a simple structure that allows a high viscosity alignment liquid to be smoothly jetted out from a supply conduit by heating the supply conduit in conveying an alignment liquid and keeps an internal temperature of the supply conduit with a temperature-keeping material arranged on an outside surface of the supply conduit so as to enhance uniformity of a surface of an alignment film to thereby ensure product quality and also improve product yield rate.

To achieve the above objects, the present invention provides a method for coating an alignment film, which comprises the following steps:

(1) providing a substrate to which an alignment film is to be coated and placing the substrate to which an alignment film is to be coated on a working table that is reciprocally movable frontward and rearward and leftward and rightward;

(2) providing a pressurization tank and depositing a predetermined amount of an alignment liquid in the pressurization tank;

(3) providing a supply tank and using a liquid pump to convey the alignment liquid contained in the pressurization tank to the supply tank;

(4) using a supply conduit to connect the supply tank to an alignment liquid jet nozzle and subjecting the supply conduit heating to reduce viscosity of the alignment liquid so as to allow the alignment liquid to smoothly move into the alignment liquid jet nozzle; and (5) operating the alignment liquid jet nozzle to apply the viscosity reduced alignment liquid to the substrate to which an alignment film is to be coated and, when necessary, reciprocally moving the working table during the process of application so as to have the alignment liquid uniformly coated on the substrate and complete the coating of the alignment film.

The substrate to which an alignment film is to be coated is a thin-film transistor array substrate or a color filter substrate.

In step (4), a way of subjecting the supply conduit to heating comprises electrical heating or water heating.

In step (4), the supply conduit is heated to a temperature range of 30-60° C. and then heating is stopped and an internal temperature of the supply conduit is kept in the temperature range.

The supply conduit has an outside surface on which a layer of a temperature-keeping material is arranged.

The present invention also provides a device for coating an alignment film, which comprises a pressurization tank that receives an alignment liquid therein, a supply tank that feeds the alignment liquid, a liquid pump that connects the pressurization tank and the supply tank, the alignment liquid jet nozzle that jets and coats the alignment liquid, a supply conduit that connects the supply tank and the alignment liquid jet nozzle, a substrate to which an alignment film is to be coated, and a working table that receives and supports the substrate to which an alignment film is to be coated thereon. The liquid pump pumps the alignment liquid from the pressurization tank to the supply tank. The supply conduit conveys the alignment liquid from the supply tank to the alignment liquid jet nozzle. The supply conduit is a heating-bearable supply conduit.

The working table is reciprocally movable frontward and rearward and leftward and rightward and the substrate to which an alignment film is to be coated is a thin-film transistor array substrate or a color filter substrate.

Heating the supply conduit is achieved with electrical heating or water heating.

The supply conduit has an internal temperature of 30-60° C. in conveying the alignment liquid.

The supply conduit has an outside surface on which a layer of a temperature-keeping material is arranged.

The present invention further provides a device for coating an alignment film, which comprises a pressurization tank that receives an alignment liquid therein, a supply tank that feeds the alignment liquid, a liquid pump that connects the pressurization tank and the supply tank, the alignment liquid jet nozzle that jets and coats the alignment liquid, a supply conduit that connects the supply tank and the alignment liquid jet nozzle, a substrate to which an alignment film is to be coated, and a working table that receives and supports the substrate to which an alignment film is to be coated thereon, the liquid pump pumping the alignment liquid from the pressurization tank to the supply tank, the supply conduit conveying the alignment liquid from the supply tank to the alignment liquid jet nozzle, the supply conduit being a heating-bearable supply conduit;

wherein the working table is reciprocally movable frontward and rearward and leftward and rightward and the substrate to which an alignment film is to be coated is a thin-film transistor array substrate or a color filter substrate.

Heating the supply conduit is achieved with electrical heating or water heating.

The supply conduit has an internal temperature of 30-60° C. in conveying the alignment liquid.

The supply conduit has an outside surface on which a layer of a temperature-keeping material is arranged.

The efficacy of the present invention is that the present invention provides a method and a device for coating an alignment film, which allow a high viscosity alignment liquid to be smoothly jetted out from a supply conduit by subjecting the supply conduit to heating and keeping an internal temperature of the supply conduit with a temperature-keeping material arranged on an outside surface of the supply conduit so as to ensure uniform coating of the high viscosity alignment liquid and enhance uniformity of a surface of an alignment film to thereby ensure product quality and also improve product yield rate.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

Figure 1:
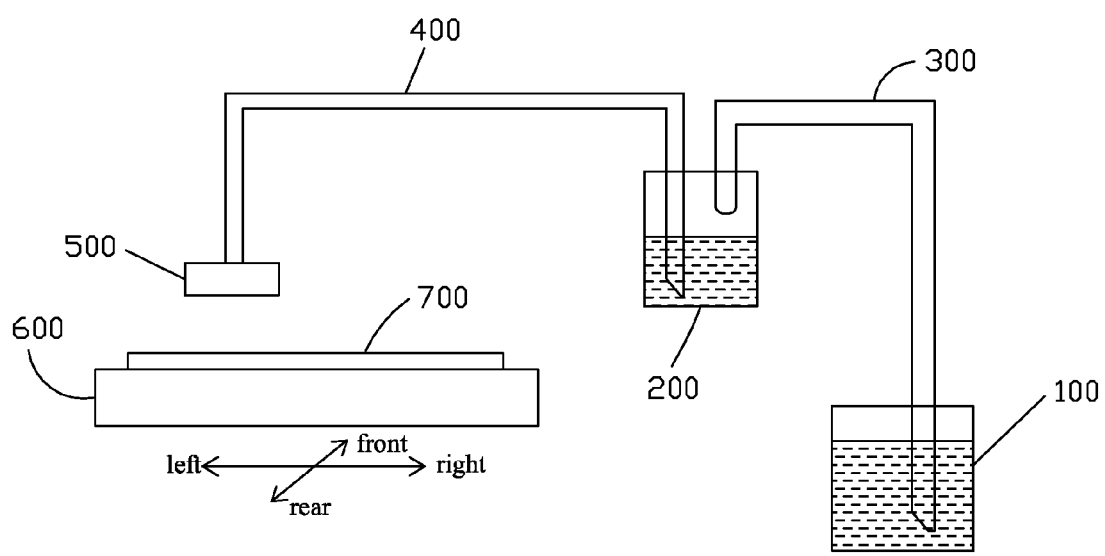
FIG. 1 is a schematic view showing a conventional alignment film coating device.
Figure 2:
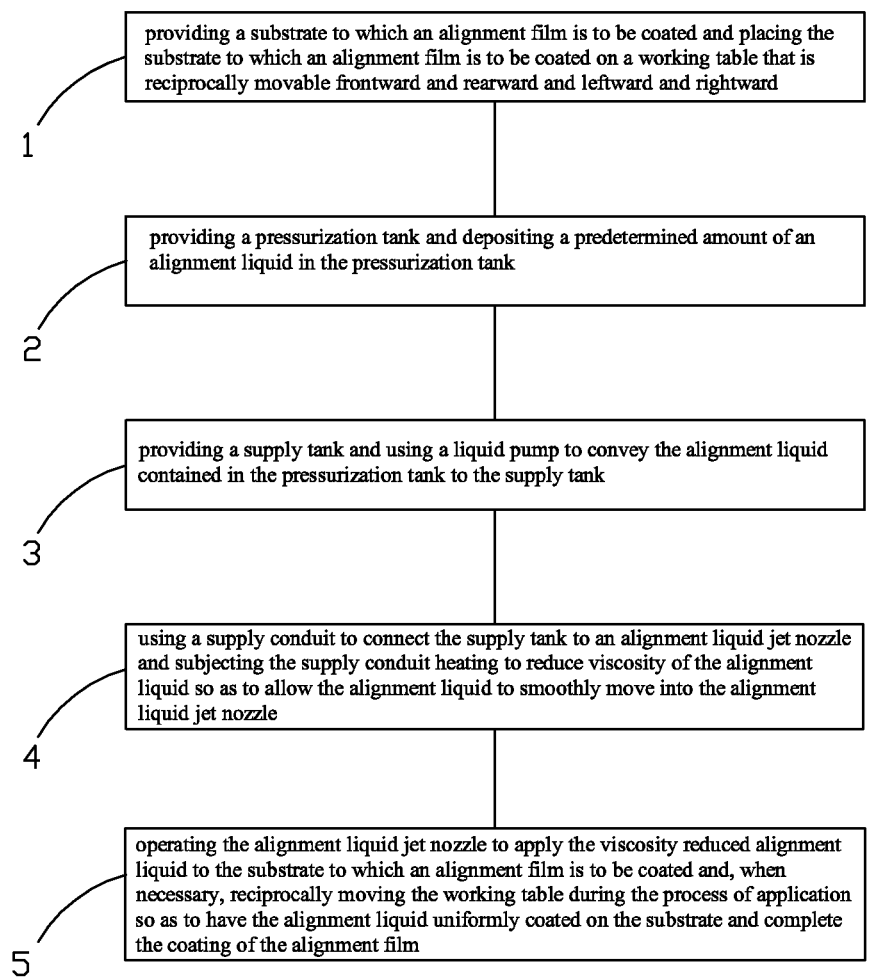
FIG. 2 is a flow chart illustrating a method for coating an alignment film according to the present invention.

Referring to FIG. 2, the present invention provides a method for coating an alignment film, which comprises the following steps:

Step 1: providing a substrate to which an alignment film is to be coated and placing the substrate to which an alignment film is to be coated on a working table that is reciprocally movable frontward and rearward and leftward and rightward.

The substrate to which an alignment film is to be coated can be a thin-film transistor array substrate or a color filter substrate. The working table can be controlled by a control device to reciprocally move frontward and rearward and leftward and rightward.

Step 2: providing a pressurization tank and depositing a predetermined amount of an alignment liquid in the pressurization tank.

The alignment liquid contains primary ingredients that include polyimide, N-methylpyrrolidone (NMP), and ethylene glycol monobutyl ether (BC).

Step 3: providing a supply tank and using a liquid pump to convey the alignment liquid contained in the pressurization tank to the supply tank.

The supply tank, the liquid pump, and the pressurization tank can be any known devices and connection made therebetween can be any known way of connection.

Step 4: using a supply conduit to connect the supply tank to an alignment liquid jet nozzle and subjecting the supply conduit heating to reduce viscosity of the alignment liquid so as to allow the alignment liquid to smoothly move into the alignment liquid jet nozzle.

In the step, a way of heating the supply conduit can be electrical heating or water heating. The supply conduit has an outside surface on which a layer of a temperature-keeping material is arranged. After the supply conduit is heated up to 30-60° C., heating is stopped and an internal temperature of the supply conduit is kept within such a range of temperature. This prevents the alignment liquid inside the supply conduit from being partly evaporated by an excessively high temperature and also reduces the viscosity of the alignment liquid to allow the alignment liquid to smoothly move into the alignment liquid jet nozzle so as to ensure smooth jetting of the alignment liquid and thus ensure uniformity of a surface of the alignment film so formed.

Step 5: operating the alignment liquid jet nozzle to apply the viscosity reduced alignment liquid to the substrate to which an alignment film is to be coated and, when necessary, reciprocally moving the working table during the process of application so as to have the alignment liquid uniformly coated on the substrate and complete the coating of the alignment film.

Figure 3:
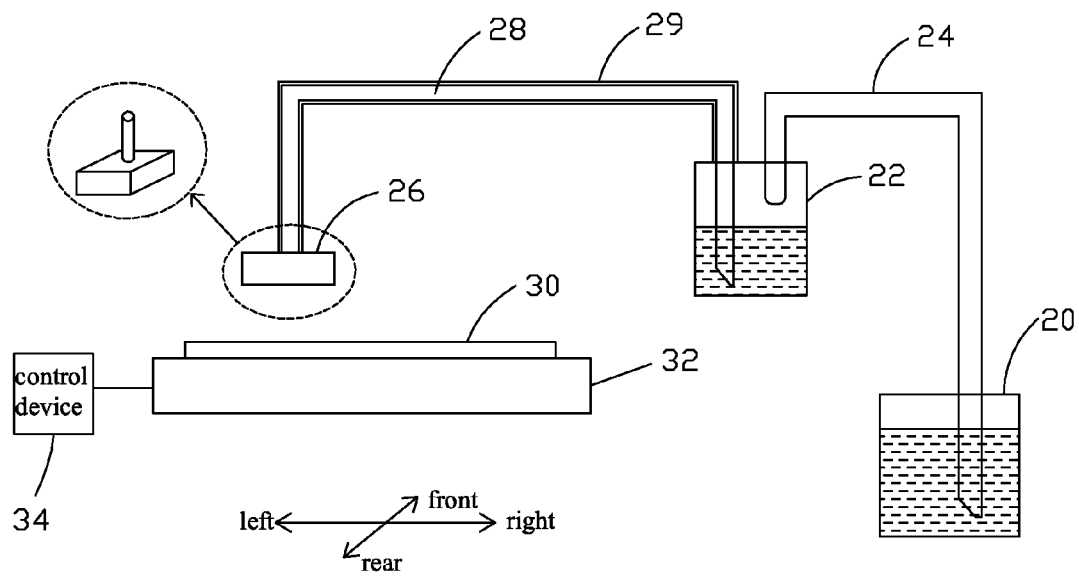
FIG. 3 is a schematic view showing the structure of a device for coating an alignment film according to the present invention.
Figure 4:
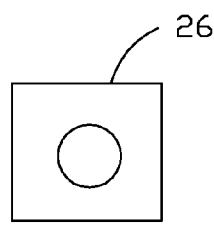
FIG. 4 is a bottom view of an alignment liquid jet nozzle of FIG. 3.

Referring to FIGS. 3 and 4, the present invention further provides a device for coating an alignment film, which comprises a pressurization tank 20 that receives an alignment liquid therein, a supply tank 22 that feeds the alignment liquid, a liquid pump 24 that connects the pressurization tank 20 and the supply tank 22, the alignment liquid jet nozzle 26 that jets and coats the alignment liquid, a supply conduit 28 that connects the supply tank 22 and the alignment liquid jet nozzle 26, a substrate 30 to which an alignment film is to be coated, and a working table 32 that receives and supports the substrate 30 to which an alignment film is to be coated thereon. The liquid pump 24 pumps the alignment liquid from the pressurization tank 20 to the supply tank 22. The supply conduit 28 conveys the alignment liquid from the supply tank 22 to the alignment liquid jet nozzle 26. The supply conduit 28 is a heating-bearable supply conduit 28.

The working table 32 is controlled by a control device 34 to reciprocally move frontward and rearward and leftward and rightward.

The substrate 30 to which an alignment film is to be coated 30 can be a thin-film transistor array substrate or a color filter substrate. The alignment liquid contains primary ingredients that include polyimide, N-methylpyrrolidone (NMP), and ethylene glycol monobutyl ether (BC).

The supply tank 22, the liquid pump 24, and the pressurization tank 20 can be connected by any know way of connection.

The alignment liquid jet nozzle 26 is of a rectangular parallelepiped configuration having an internal receiving space and a top connected to the supply conduit 28 to allow the alignment liquid supplied through the supply conduit 28 to flow into the receiving space and a bottom in which a circular hole is formed for jetting the alignment liquid from the receiving space out to the substrate 30 to which an alignment film is to be coated.

When conveying the alignment liquid, the supply conduit 28 needs to be heated. Away of heating the supply conduit 28 can be electrical heating or water heating. In conveying the alignment liquid, the internal temperature of the supply conduit 28 is 30-60° C. This can be achieved by heating the supply conduit 28 to 30-60° C. and then stopping the heating and keeping the temperature of the supply conduit 28 in the range of temperature. This prevents the alignment liquid inside the supply conduit 28 from being partly evaporated by an excessively high temperature and also reduces the viscosity of the alignment liquid to allow the alignment liquid to smoothly move into the alignment liquid jet nozzle 26 so as to ensure smooth jetting of the alignment liquid and thus ensure uniformity of a surface of the alignment film so formed.

The supply conduit 28 has an outside surface on which a layer of a temperature-keeping material 29 is arranged to ensure the internal temperature of the supply conduit 28 to be kept with a desired range of temperature to help the alignment liquid to follow.

In summary, the present invention provides a method and a device for coating an alignment film, which allow a high viscosity alignment liquid to be smoothly jetted out from a supply conduit by subjecting the supply conduit to heating and keeping an internal temperature of the supply conduit with a temperature-keeping material arranged on an outside surface of the supply conduit so as to ensure uniform coating of the high viscosity alignment liquid and enhance uniformity of a surface of an alignment film to thereby ensure product quality and also improve product yield rate.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for coating an alignment film, comprising the following steps:
   (1) providing a substrate to which an alignment film is to be coated and placing the substrate to which an alignment film is to be coated on a working table that is reciprocally movable frontward and rearward and leftward and rightward;
   (2) providing a pressurization tank and depositing a predetermined amount of an alignment liquid in the pressurization tank;
   (3) providing a supply tank and using a liquid pump to convey the alignment liquid contained in the pressurization tank to the supply tank;
   (4) using a supply conduit to connect the supply tank to an alignment liquid jet nozzle and subjecting the supply conduit to heating to reduce viscosity of the alignment liquid so as to allow the alignment liquid to smoothly move from the supply tank into the alignment liquid jet nozzle, wherein subjecting the supply conduit to heating is conducted in such a way that the supply conduit is heated to a predetermined temperature range and then heating is stopped to prevent evaporation of the alignment liquid in the supply conduit and wherein the supply conduit is provided with a layer of temperature-keeping material on an outside surface thereof to keep the supply conduit in the predetermined temperature range; and
   (5) operating the alignment liquid jet nozzle to apply the viscosity reduced alignment liquid to the substrate to which an alignment film is to be coated and reciprocally moving the working table during the process of application so as to have the alignment liquid uniformly coated on the substrate and complete the coating of the alignment film.

2. The method for coating the alignment film as claimed in claim 1, wherein the substrate to which an alignment film is to be coated is a thin-film transistor array substrate or a color filter substrate.

3. The method for coating the alignment film as claimed in claim 1, wherein in step (4), a way of subjecting the supply conduit to heating comprises electrical heating or water heating.

4. The method for coating the alignment film as claimed in claim 3, wherein in step (4), the predetermined temperature range is 30-60° C. and an internal temperature of the supply conduit is kept in the temperature range.

* * * * *